United States Patent [19]
Chang

[11] Patent Number: 5,696,991
[45] Date of Patent: Dec. 9, 1997

[54] METHOD AND DEVICE FOR PARALLEL ACCESSING DATA WITH OPTIMAL READING START

[75] Inventor: Alber Chang, Hsinchu, Taiwan

[73] Assignee: Winbond Electronics Corporation, Hsinchu, Taiwan

[21] Appl. No.: 346,094

[22] Filed: Nov. 29, 1994

[51] Int. Cl.[6] ................................................ G06F 13/00
[52] U.S. Cl. .......................... 395/872; 395/250; 395/877
[58] Field of Search ............................ 395/457, 474, 395/475, 477, 476, 495, 250, 872, 877

[56] References Cited

U.S. PATENT DOCUMENTS

| | | | |
|---|---|---|---|
| 4,980,852 | 12/1990 | Giroir et al. | 395/310 |
| 5,210,829 | 5/1993 | Bitner | 395/250 |
| 5,412,780 | 5/1995 | Rushton | 395/250 |
| 5,412,782 | 5/1995 | Hausman et al. | 395/250 |
| 5,440,523 | 8/1995 | Joffe | 365/230.05 |
| 5,566,315 | 10/1996 | Milillo et al. | 395/440 |

*Primary Examiner*—William M. Treat
*Assistant Examiner*—Kenneth R. Coulter
*Attorney, Agent, or Firm*—David G. Conlin; David D. Lowry

[57] ABSTRACT

The present method for accessing a data in a common accessing medium into and out of which the data are parallelly written and read respectively includes steps of: a) determining a reference data length according to a data-writing rate at which the data is written into the common accessing medium, a data-reading rate at which the data is read out of the common accessing medium, and a data length of the data; b) writing the data into the common accessing medium at the data-writing rate; c) reading the data out of the common accessing medium at the data-reading rate when a data length of the written data in the step b) is up to the reference data length; and d) keeping on respectively writing into and reading out of the common accessing medium the data until the data is completely written into and completely read out of the common accessing medium. By this method, an optimal accessing efficiency can be obtained.

21 Claims, 3 Drawing Sheets

METHOD AND DEVICE FOR PARALLEL ACCESSING DATA WITH OPTIMAL READING START

FIELD OF THE INVENTION

The present invention is related to a method or a device for accessing data, and more particularly to a method or a device for accessing data in a common accessing medium.

BACKGROUND OF THE INVENTION

Concerning the computer communication, several kinds of devices, e.g. fax (facsimile) device, MODEM device, network device, etc., are applied to this field so that data-accessing operations usually continuously proceed in a common accessing medium, e.g. a buffer or a memory. In other words, the data inputted into the common accessing medium are usually outputted immediately. If the data-writing and the data-reading operations proceed simultaneously, the accessing process is called "parallel accessing".

Two conventional methods used for continuously accessing data are described as follows.

The first one is "sequential accessing method". Referring to FIG. 1, the device for implementing the sequential accessing method includes a buffer 10, a data-writing device 11 which inputs a data into the buffer 10, and a data-reading device 12 which reads the data from the buffer 10. By this method, the data-writing device 11 completely inputs the data into the buffer 10 first, and then sends an interrupt signal or other enabling signal to start the data-reading device 12 to read the data out. The shortcomings of this method are described below:

1. If it takes a time of $T_W$ for the data-writing device 11 to completely input a data into the buffer 10 and a time of $T_R$ for the data-reading device 12 to completely read the data out of the buffer 10, a relatively long total time, $T_W$ plus $T_R$, is needed to accomplish an accessing cycle.

2. Another data to be written to the buffer 10 cannot be inputted until the data in the buffer 10 is completely read out so that the communication efficiency is limited.

The second method for accessing data is "parallel accessing method". Referring to FIG. 2, the device for implementing the parallel accessing method includes a buffer 20, a data-writing device 21 which inputs a data into the buffer 20, and a data-reading device 22 which reads the data from the buffer 20. By this method, when the data-writing device 21 inputs the data into the buffer 20, the data-reading device 22 reads the data out of the buffer 20 simultaneously. If it takes a time of $T_W$ for the data-writing device 21 to completely input a data into the buffer 20 and a time of $T_R$ for the data-reading device 22 to completely read the data out of the buffer 20, the time spent for accessing the data would be the larger one of $T_W$ and $T_R$. The shortcomings of this method are described below:

1. In general, the data-reading rate of the data-reading device 22 is greater than the data-writing rate of the data-writing device 21 so that an "over read" situation will occur. That is, the data-reading device 22 reads so fast that extra unrequired data may be read by the data-reading device 22. In order to avoid the "over read" situation, a synchronous signal is usually used to synchronize the data-reading device 22 and the data-writing device 21. The data-reading device 22 can be informed of reading a certain length of data which is stored in a certain location in the buffer 20 through the synchronous signal. The synchronous signal can be generated by the hardware, e.g. a counter, or software. Of course, the device for implementing the parallel accessing method is more complicated than that for implementing the sequential accessing method.

2. In a multitasking system, if the data-reading device 22 is a software, it will often occupy the working time of the managing chip, e.g. CPU, to detect the synchronous signal. Thus most of the working time of the system has to be spent in detecting the synchronizing situation and the other tasks will be ignored. The total throughput of the system will also be greatly reduced.

SUMMARY OF THE INVENTION

An object of the present invention is to offer a method and a device for accessing a data in a common accessing medium to obtain the greatest accessing efficiency.

In accordance with the present invention, a method for accessing a data in a common accessing medium into and out of which the data are parallelly written and read respectively includes steps of: a) determining a reference data length according to a data-writing rate at which the data is written into the common accessing medium, a data-reading rate at which the data is read out of the common accessing medium, and a data length of the data; b) writing the data into the common accessing medium at the data-writing rate; c) reading the data out of the common accessing medium at the data-reading rate when a data length of the written data in the step b) is up to the reference data length; and d) keeping on respectively writing into and reading out of the common accessing medium the data until the data is completely written into and completely read out of the common accessing medium. The common accessing medium can be a buffer or a memory, and a capacity of the common accessing medium is not less than the data length of the data.

In accordance with another aspect of the present invention, different data may have different data lengths. The reference data length is set to be $[(1-(S_W/S_R))\times N]$ (bytes) when $S_R > S_W$ wherein $S_R$ represents the data-reading rate (byte/second), $S_W$ represents the data-writing rate (byte/second) and N represents a data length of the data (byte); and the reference data length is set to be 1 (byte) when $S_R \leq S_W$ wherein $S_R$ represents the data-reading rate (byte/second) and $S_W$ represents the data-writing rate (byte/second). The present method is used in a computer communication network.

In accordance with another aspect of the present invention, a device for implementing the method includes a data-reading device for reading the data out of the common accessing medium, and a data-writing device for writing the data into the common accessing medium, determining the reference data length, and outputting an enabling signal to start the data-reading device to read when the data length of the written data is up to the reference data length. The enabling signal is a hardware signal when the data-writing device is a software device. For example, the data-writing device is a CPU and the data-reading device is a network device, a fax device, a MODEM device, or a disk drive.

In accordance with another aspect of the present invention, another preferred device for implementing the method includes a data-reading device for determining the reference data length and reading the data out of the common accessing medium, and a data-writing device for writing the data into the common accessing medium, and outputting an enabling signal to start the data-reading device to read when the data length of the written data is up to the reference data length, wherein the data-writing device can be a CPU, the enabling signal can be an interrupt vector, and the data-reading device can be a network device, a fax device, a MODEM device or a disk drive.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
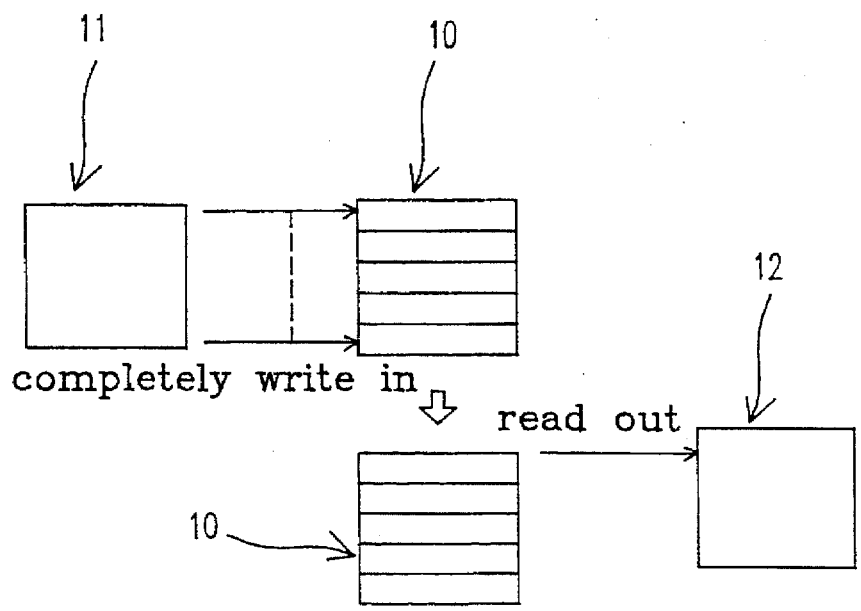
FIG. 1 is a schematic diagram showing a conventional sequential accessing method in a common accessing medium.
Figure 2:
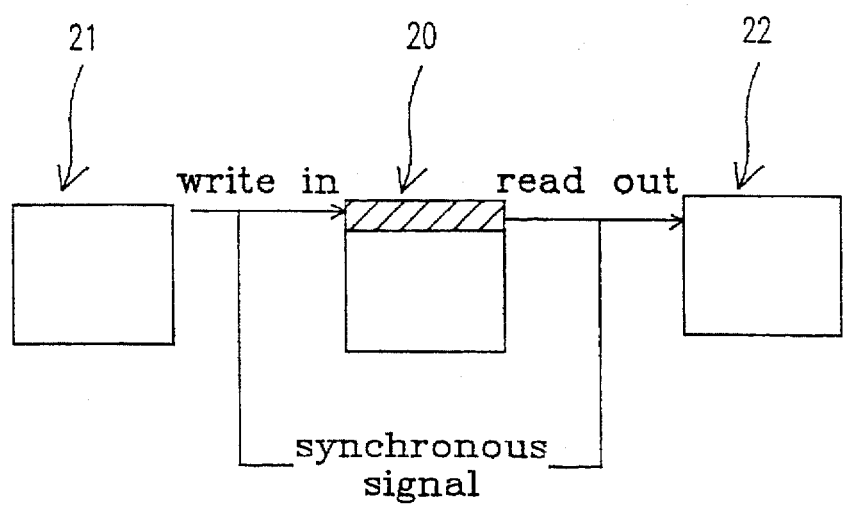
FIG. 2 is a schematic diagram showing a conventional parallel accessing method in a common accessing medium.
Figure 3A:
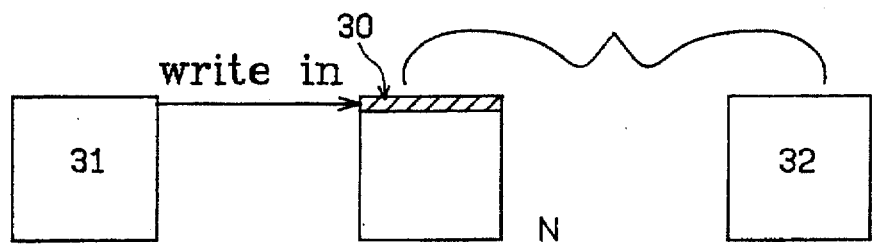
FIGS. 3A, 3B, 3C, and 3D are a series of schematic diagrams showing a parallel accessing method according to the present invention used when a data-writing rate is smaller than a data-reading rate.
Figure 3B:
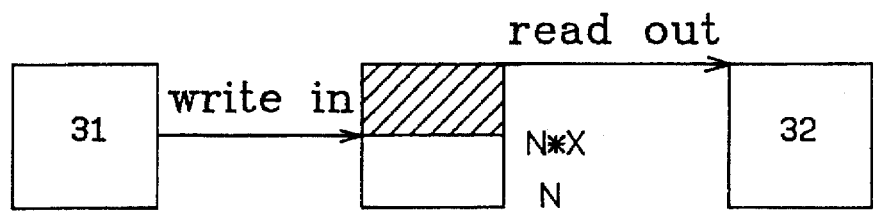
Figure 3C:
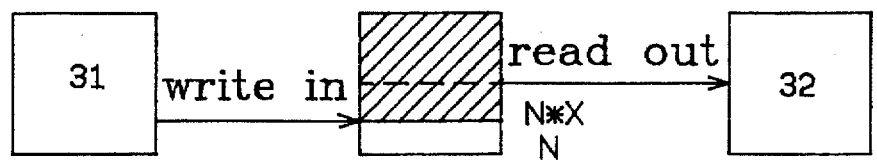
Figure 3D:
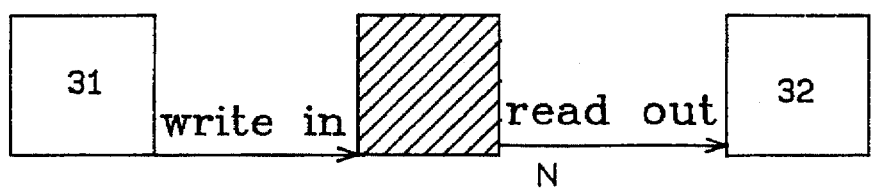
Figure 4A:
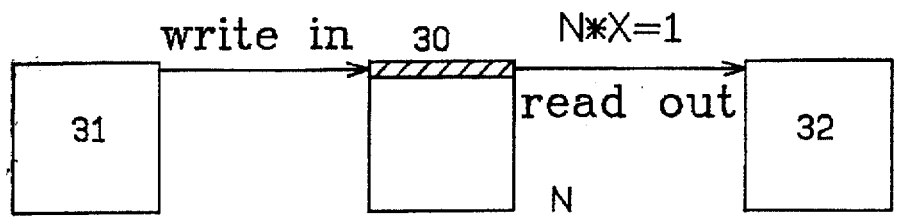
FIGS. 4A, 4B, 4C, and 4D are a series of schematic diagrams showing a parallel accessing method according to the present invention used when a data-writing rate is greater than a data-reading rate.
Figure 4B:
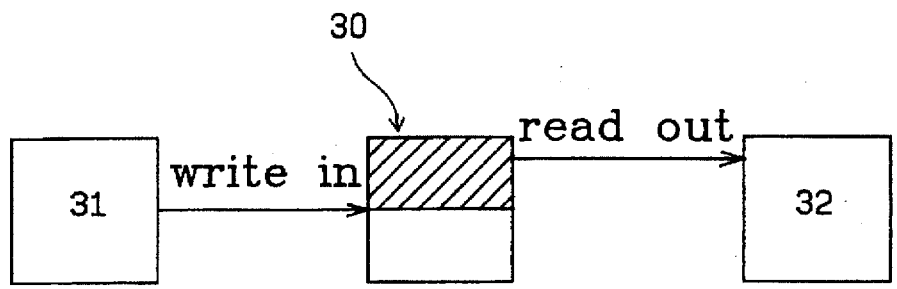
Figure 4C:
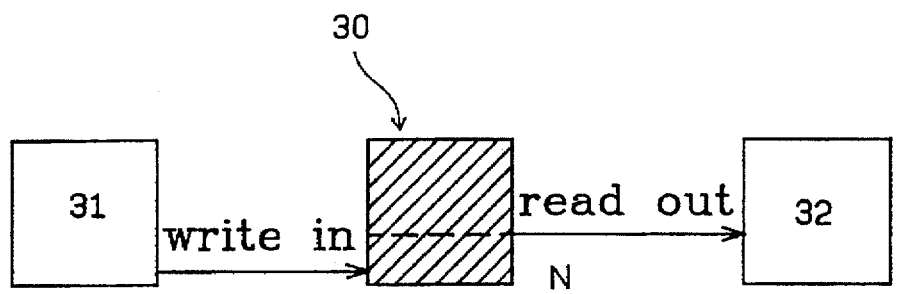
Figure 4D:
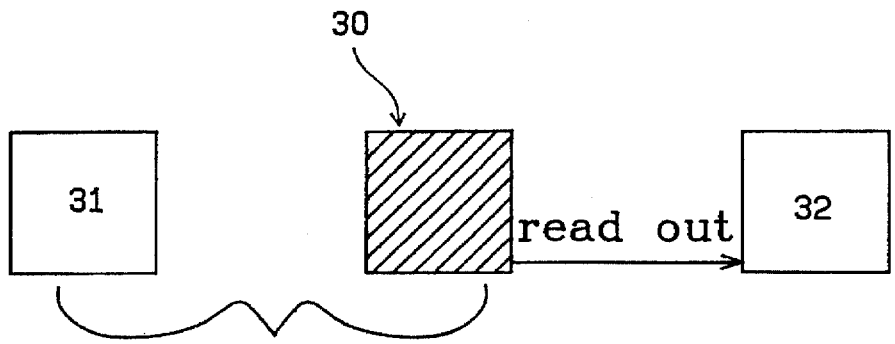

Please refer to FIGS. 3A, 3B, 3D, 4A, 4B, 4C, and 4D. The data-writing rate $S_W$ is the rate that a data-writing device 31 writes a data having a length of N bytes into a buffer 30 and has a unit of byte/second. The data-reading rate $S_R$ is the rate that a data-reading device 32 reads the N-byte data out from a buffer 30 and also has a unit of byte/second. A preferred embodiment according to the present invention is executed in steps of:

1) determining a reference data length Nref according to the data-writing rate $S_W$, the data-reading rate $S_R$, and the data length N;

2) writing the data into the buffer 30 at the data-writing rate $S_W$;

3) reading the data out of the buffer 30 at the data-reading rate $S_R$ when a data length of the written data in the step 2) is up to the reference data length Nref; and 4) keeping on respectively writing into and reading out of the buffer 30 the data until the data is completely written into and completely read out of the buffer 30.

When $S_R > S_W$, as shown in FIGS. 3A–3D, set $$X = 1 - S_W/S_R, \quad 0 < X < 1$$

$$Nref = N \times X = N \times (1 - (S_W/S_R))$$

Because $S_W < S_R$, the data-reading device 32 finishes reading the data in the buffer 30 almost on the moment the data-writing device 31 finishes writing the data into the buffer 30.

When $S_R \leq S_W$, as shown in FIGS. 4A, 4B, 4C, and 4D, set $$Nref = N \times X = 1$$

Because $S_W \geq S_R$, the data-reading device 32 has not finished reading the data in the buffer 30 yet when the data-writing device 31 finishes writing the data into the buffer 30. Meanwhile, the data-writing device 31 is in an idle state while the data-reading device 32 keeps on reading the data until the data is completely read out of the buffer 30.

By the present method, if it takes a time of $T_W$ for the data-writing device 31 to completely input a data into the buffer 30 and a time of $T_R$ for the data-reading device 32 to completely read the data out of the buffer 30, the time needed to accomplish an accessing cycle is $T_W$ when $S_W \leq S_R$, and $T_R$ when $S_W \geq S_R$, i.e. $\text{Max}[T_W | T_R]$.

To sum up, the present invention utilizes the data-writing rate $S_W$, the data-reading rate $S_R$, and the data length N to determine the reference data length and thus determine the optimal reading start. The present invention can accomplish an accessing cycle at a period of $\text{Max}[T_W | T_R]$ without any synchronous signal generator, hardware or software, so that the defect that the throughput of the system is reduced can be avoided. Of course, the optimal accessing efficiency can therefore be obtained.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for accessing a data having a data length in a common accessing medium into and out of which said data are parallelly written and read respectively comprising steps of:

a) determining a reference data length according to a data-writing rate at which said data is written into said common accessing medium, a data-reading rate at which said data is read out of said common accessing medium, and said data length of said data;

b) writing said data into said common accessing medium from the beginning element of said data at said data-writing rate;

c) reading said data out of said common accessing medium from the beginning element of said data at said data-reading rate when a data length of said written data in said step b) is up to said reference data length; and d) keeping on respectively writing into and reading out of said common accessing medium said data until said data is completely written into and completely read out of said common accessing medium, wherein said reference data length in step a) is set to be $N \times (1-(S_W/S_R))$ when $S_R > S_W$, wherein $S_R$ represents said data-reading rate, $S_W$ represents said data-writing rate and N represents said data length.

2. A method according to claim 1, wherein said common accessing medium is a buffer.

3. A method according to claim 1, wherein said common accessing medium is a memory.

4. A method according to claim 1, wherein a capacity of said common accessing medium is not less than the data length of said data.

5. A method according to claim 1, wherein different data may have different data lengths.

6. A method according to claim 1, wherein said reference data length is set to be 1 (byte) when $S_R \leq S_W$ wherein $S_R$ represents said data-reading rate (byte/second) and $S_W$ represents said data-writing rate (byte/second).

7. A method according to claim 1 used in a computer communication network.

8. A device for implementing said method according to claim 1, comprising:

a data-reading device for reading said data out of said common accessing medium; and a data-writing device for writing said data into said common accessing medium, determining said reference data length, and outputting an enabling signal to start said data-reading device to read when said data length of said written data is up to said reference data length.

9. A device according to claim 8, wherein said enabling signal is a hardware signal when said data-writing device is a software device.

10. A device according to claim 8, wherein said data-writing device is a CPU.

11. A device according to claim 8, wherein said data-reading device is a network device.

12. A device according to claim 8, wherein said data-reading device is a fax device.

13. A device according to claim 8, wherein said data-reading device is a MODEM device.

14. A device according to claim 8, wherein said data-reading device is a disk drive.

15. A device for implementing said method according to claim 1, comprising:

a data-reading device for determining said reference data length and reading said data out of said common accessing medium; and a data-writing device for writing said data into said common accessing medium, and outputting an enabling signal to start said data-reading device to read when said data length of said written data is up to said reference data length.

16. A device according to claim 15, wherein said data-writing device is a CPU.

17. A device according to claim 16, wherein said enabling signal is an interrupt vector.

18. A device according to claim 15, wherein said data-reading device is a network device.

19. A device according to claim 15, wherein said data-reading device is a fax device.

20. A device according to claim 15, wherein said data-reading device is a MODEM device.

21. A device according to claim 15, wherein said data-reading device is a disk drive.

* * * * *